United States Patent [19]

Bennett et al.

[11] 4,291,215

[45] Sep. 22, 1981

[54] BONDING A HIGHLY CONDUCTIVE ARC-RESISTANT ELECTRICAL CONTACT PAD ON A METAL BODY

[75] Inventors: Moreland P. Bennett; Edward A. Vrabel, both of Hickory, N.C.

[73] Assignee: General Electric Company, Philadelphia, Pa.

[21] Appl. No.: 25,158

[22] Filed: Mar. 29, 1979

[51] Int. Cl.[3] .............................................. B23K 11/20

[52] U.S. Cl. ................................ 219/118; 219/78.02; 219/91.2; 219/91.23

[58] Field of Search ................. 219/78.01, 91.2, 91.22, 219/91.23, 92, 117.1, 118, 152, 85 CA, 85 CM, 85 M, 111, 78.02

[56] References Cited

U.S. PATENT DOCUMENTS

| | | | |
|---|---|---|---|
| 1,261,943 | 4/1918 | Lashar | 219/91.23 |
| 2,307,579 | 1/1943 | Fluke | 219/91.23 X |
| 2,826,674 | 3/1958 | Peras | 219/111 X |
| 2,909,643 | 10/1959 | Graves | 219/85 CM X |
| 3,141,949 | 7/1964 | Lovell | 219/91.2 X |
| 3,720,805 | 3/1973 | Fitzgerald | 219/152 |
| 3,859,491 | 1/1975 | Larson | 219/117.1 X |
| 4,130,750 | 12/1978 | Bennett et al. | 219/118 X |

FOREIGN PATENT DOCUMENTS

| | | | |
|---|---|---|---|
| 908962 | 9/1972 | Canada | 219/118 |

OTHER PUBLICATIONS

"Heat Treat Your Resistance Welds—Use Electronic Tempering Control CR7503-D149", General Electric Control, Sales Pamphlet; 4-44 (4M) Filing No. 8960; GEA-4201; General Electric, Schenectady, N.Y., Apr. 1944.

*Primary Examiner*—Gene Z. Rubinson
*Assistant Examiner*—Keith E. George
*Attorney, Agent, or Firm*—William Freedman; Carl L. Silverman

[57] ABSTRACT

One form of the method includes disposing a silver contact pad on only a portion of a metal body. The joint between the silver contact pad and the metal body includes a metal which is metallurgically compatible with the silver contact pad and with the metal body. Heat and pressure are applied to the joint through welding electrodes. This joins the contact pad to the metal body and forms a metallurgical bond therebetween. In one embodiment, the metal body comprises copper and the compatible metal comprises tin. The welding electrodes may include shaping surfaces thereon so that the contact pad can be joined to the metal body while substantially simultaneously shaping the combination of the contact pad and the metal body. The resultant contact pad is arc-resistant,i.e., resistant to erosion, and has a typical thickness in the range of from about 0.0005" to about 0.010".

8 Claims, 9 Drawing Figures

BONDING A HIGHLY CONDUCTIVE ARC-RESISTANT ELECTRICAL CONTACT PAD ON A METAL BODY

BACKGROUND OF THE INVENTION

The present invention relates to a method of obtaining a highly conductive arc-resistant electrical contact pad on a metal body, and more particularly to such a method which includes substantially simultaneously joining the contact pad to the metal body and shaping the combination of the contact pad and the metal body.

In the electrical industry, electrical contacts, or contact pads, of many forms are needed. For example, in the transmission and distribution of electrical power, various protective equipment devices, e.g., switches, cut-outs, fuses, etc., are employed. Such devices generally include electrical contacts which must be highly electrically conductive and also must be capable of opening and closing while carrying a current load. These highly electrically conductive contacts should also be resistant to arcing, i.e., resistant to erosion, as it is well known that arcing generally results when electrical contacts are opened and closed under a current load.

Conventional techniques to provide such highly conductive arc-resistant electrical contacts, or contact pads, have been satisfactory in many respects. However, such conventional techniques have several disadvantages both in the processing and in the resultant contact. For example, in the case of a cut-out structure, such as the one disclosed in U.S. Pat. No. 3,377,447, entitled, "Load Break for Open Type Cut-Outs," issued Apr. 9, 1968 to Hermann et al., one conventional technique to obtain an electrical contact is to selectively silver plate the appropriate portion(s) of the necessary metal components of the cut-out structure. Typical plating thicknesses for such applications are generally in the range of 0.0002 to 0.0005 inches. Such thicknesses are often insufficient to provide a desirable degree of arc-resistance. However, satisfactory plating thicknesses greater than the foregoing are difficult to obtain because such thicknesses generally are difficult to maintain uniformity. Also, such thicknesses often result in poor metallurgical qualities. Further, from a processing or manufacturing viewpoint, accurate selective plating of a portion of a surface of a metal body is difficult to achieve because it requires much handling of parts, including masking thereof. Also, such selective plating is undesirably time consuming.

Accordingly, it is a common industrial practice to plate the entire surface of the involved metal component, including the area which is to serve as the electrical contact or contact pad. Such an extensive plating practice is quite undesirable in view of the considerable expense of contact materials, such as silver. Also, in conventional plating techniques, if it is necessary to shape the involved component and its plated contact pad, such shaping is generally provided after the plating step. From a manufacturing standpoint, this may be undesirable as the typical plating thicknesses of 0.0002" to 0.0005" are susceptible to damage, e.g., scratching during such shaping.

Accordingly, it is a general object of this invention to provide a method of obtaining a highly conductive arc-resistant electrical contact pad on a portion of a surface of a metal body.

Another object of this invention is to provide such a method which includes substantially simultaneously joining such a contact pad to the metal body while shaping the combination of the contact pad and the metal body.

Another object of this invention is to provide such a highly conductive arc-resistant electrical contact pad on a portion of a surface of a metal body.

SUMMARY

In carrying out one form of the present invention, we provide a method of obtaining a highly conductive arc-resistant electrical contact pad on a predetermined portion of a surface of a metal body. The method includes the steps of providing the metal body to which the contact pad is to be joined and providing the contact pad. The contact pad is of silver or an alloy thereof. The contact pad is disposed on only a portion of the surface of the metal body with the joint between the metal body and the contact pad including a compatible metal. The compatible metal has a melting point lower than the melting points of the metal body and the contact pad and is metallurgically compatible with the metal body and with the contact pad. Heat and pressure are applied to the joint, including passing an electrical current through the joint to join the contact pad to the metal body and to form a metallurgical bond therebetween.

BRIEF DESCRIPTION OF THE DRAWINGS

While the specification concludes with claims particularly pointing out and distinctly claiming that which is regarded as the present invention, the objects and advantages of this invention can be more readily ascertained from the following description of preferred embodiments, when read in conjunction with the accompanying drawings, in which:

DETAILED DESCRIPTION OF THE INVENTION

Figure 1:
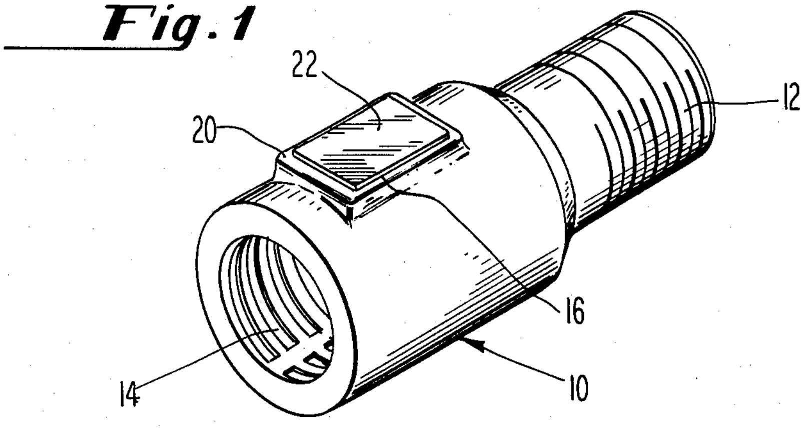
FIG. 1 is a perspective view showing a component of electrical apparatus having a contact pad joined thereto through one form of the method of the present invention.

Referring initially to FIG. 1, an exemplary electrical component, generally designated 10, is shown. The component 10 is sleeve-shaped and includes opposed threaded portions 12 and 14, with threaded portion 14 being internally threaded and threaded portion 12 being externally threaded. The electrical component 10 is of a metal material such as brass and may be formed through casting techniques. The electrical component 10 includes a flat surface portion 20 which has a highly conductive contact pad 22 joined thereto through a compatible metal member 16. The contact pad 22 comprises a highly electrically conductive material, such as silver or an alloy thereof. Such alloys include silver-copper alloys. Typically, the thickness of the contact pad 22 is in the range of about 0.003" to 0.006". For the above materials, the compatible metal member 16 may be tin coated copper. In addition to being highly electrically conductive, contact pad 22 is resistant to arcing, i.e., resistant to erosion. Hereinafter, in the following description, the term, "arc-resistant," will often be employed to indicate that the contact pad is resistant to erosion.

Figure 2:
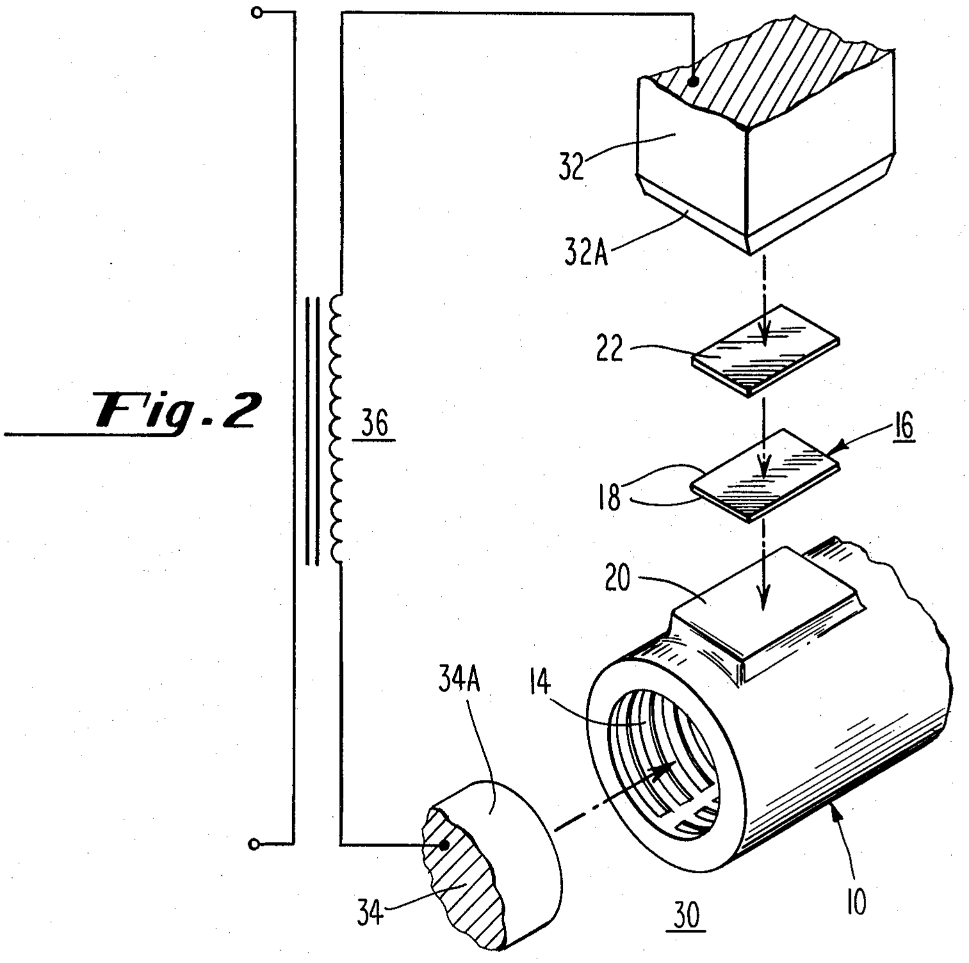
FIG. 2 is a schematic view showing the manner in which one form of the method of the present invention is employed to obtain the structure of FIG. 1.

Referring now to FIG. 2, one form of the method of the present invention employed to obtain the structure of FIG. 1 will now be discussed. More particularly, apparatus 30 includes a pair of opposing electrode members 32, 34 which are connected across the secondary winding of a transformer 36 so as to be capable of passing an electrical current therebetween when the electrodes 32, 34 are brought together to contact metal members which are to be joined together. The electrodes 32, 34 are also provided with means to apply pressure (shown as an arrow) to the metal members which are to be joined together. The passage of electrical current between the electrodes 32, 34, and the metal members disposed therebetween, provides heat to the members to be joined. This type of joining process is generally termed resistance bonding.

Resistance bonding may be in the form where substantially all the heat developed during the joining process is developed through the electrical resistance provided by the joint. In such an application, the electrodes 32, 34 are typically of relatively high conductivity material, such as copper or copper alloy. Resistance heating may also include a thermal heating effect wherein, in addition to the resistance heating at the joint, the electrodes 32, 34 are chosen to be of a relatively low conductivity material with respect to copper or copper alloy, e.g., refractory materials such as tungsten and molybdenum, so that the electrical current passing therethrough also heats the electrodes 32, 34.

In accordance with one form of the present invention, the electrodes 32, 34 are further provided with pressure and contact surfaces 32A, 34A which are of predetermined configurations so as to substantially simultaneously join a contact pad to a metal body while shaping the combination of the contact pad and the metal body.

In carrying out one form of the method of the present invention with the apparatus 30 of FIG. 2 to obtain the contact pad structure of FIG. 1, the electrode 34 is preferably of a high conductivity material, such as copper or copper alloy, and includes a curved contact and pressure surface 34A which is adapted to be inserted within the internally threaded passage 14 of sleeve-shaped component 10. When inserted within the threaded passage 14, contact and pressure surface 34A is disposed under flat surface 20 with surface 34A substantially conforming to the internal curvature of passage 14 (not shown). Electrode 32 includes a brazed refractory facing having a flat contact and pressure surface 32A which substantially conforms to flat surface 20 of the sleeve 10.

In one such method, a silver or silver alloy shim 22 is employed. The shim 22 corresponds to the contact pad 22 of FIG. 1. The shim 22 has a typical thickness of about 0.0005" to about 0.010", with about 0.006" being preferred. Preferably, a shim 16 of a compatible metal is also employed as, in this case, component 10 is brass. The purpose of compatible shim 16 is to improve upon the metallurgical bond which would otherwise form between the silver and brass. The shim 16 may comprise a copper plate having tin coatings 18 on opposing surfaces thereof. Typically, the copper thickness is about 0.010" to about 0.030" and each of the tin coatings 18 has a thickness of about 0.0005". Electrodes 32, 34 are then urged together to apply to the silver shim 22—compatible shim 16—sleeve 10 combination about 1100 lbs. to about 1400 lbs. of force while passing an electrical current therebetween in the range of about 20,000 amperes to about 24,000 amperes. Such heat and pressure are applied to the joint for a heating period followed by a cooling period. Typically, such heating period may comprise 30 cycles followed by 5 cycles of cooling period. This heating-cooling sequence is then repeated 4 or 5 times. This procedure results in metallurgical bonding and the contact pad structure shown in FIG. 1. Repeating the heating-cooling sequence allows the amount of heat introduced into the joint to be carefully controlled, and hence, prevents damage to the joint which might otherwise occur if the amount, and rate of heating, were less carefully controlled.

Figure 3:
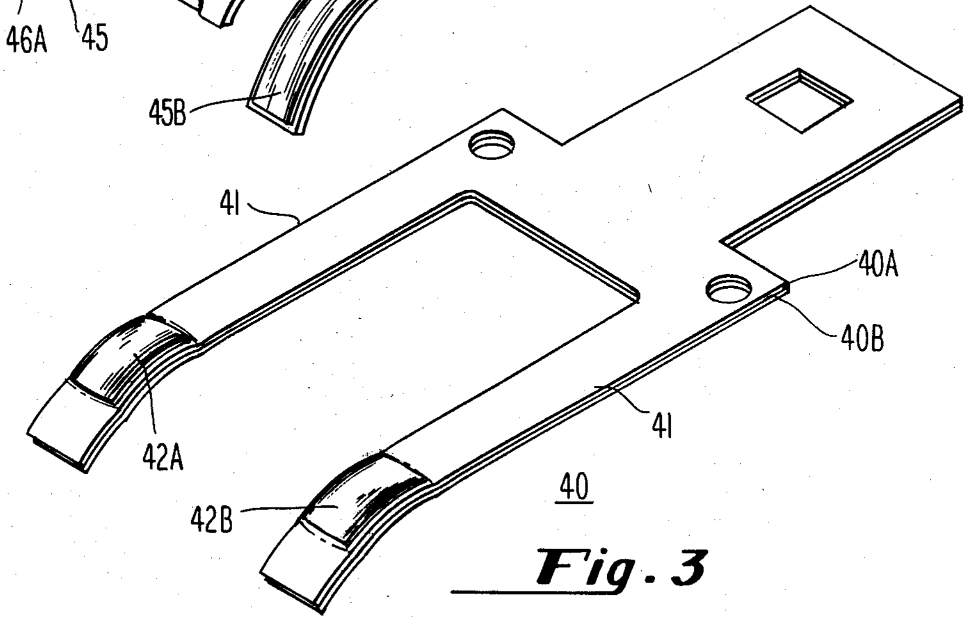
FIG. 3 is a perspective view showing another component of electrical apparatus having a pair of contact pads joined thereto through one form of the method of the present invention.

Referring now to FIG. 3, another exemplary electrical component, generally designated 40, is shown. The component 40 is a spring-type contact which may be employed in a cut-out structure similar to the one shown in previously mentioned U.S. Pat. No. 3,377,447. The component 40 includes a pair of separate contact pads 42A, 42B on separate legs 41 thereof. The contact pads 42A, 42B are preferably silver or silver alloy and have a typical thickness of about 0.003 to 0.006 inches. The contact pads 42A, 42B have a predetermined curvature along the length of the arcuate legs 41 as well as orthogonally to the length of the legs. Such predetermined curvatures are useful in assuring good electrical contact with other components. The spring capability of the contact 40 is provided through the structure which actually includes a pair of initially flat U-shaped structures 40A, 40B which are joined together in a manner which will be discussed below.

Figure 4:
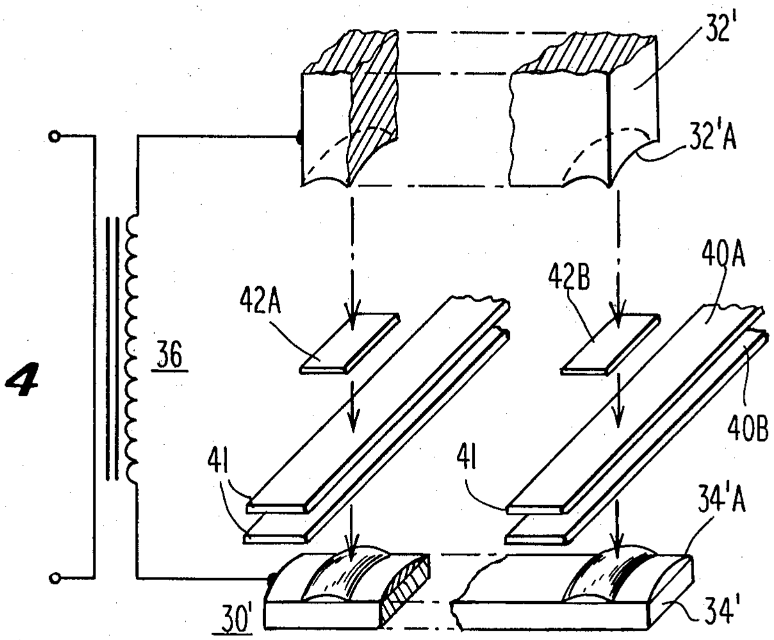
FIG. 4 is a schematic view showing the manner in which one form of the method of the present invention is employed to obtain the structure of FIG. 3.

Referring now to FIG. 4, one form of the method employed to obtain the contact pad structure of FIG. 3 will now be discussed. Apparatus 30' of FIG. 4 is similar to apparatus 30 of FIG. 2 so that like and/or primed (')

reference numerals have beem employed. More particularly, electrodes 32', 34' respectively include curved shaping surfaces 32'A, 34'A. Each electrode 32', 34' preferably comprises a refractory metal. In accordance with this form of the method of the present invention, a pair of flat U-shaped metal members 40A, 40B (partially shown in FIG. 4) are disposed with one atop the other. Each of the U-shaped metal members 40A, 40B may comprise tin coated copper, where the copper is about 0.030" in thickness and the tin is about 0.0005" in thickness. The contact pads 42A, 42B may be in the form of silver or silver alloy shims 42A, 42B which are placed on the separate legs 41 of the pair of metal members 40A, 40B. The silver shim thickness is about 0.003". The three metal members, i.e., silver shims 42A, 42B, metal member 40A, metal member 40B are aligned in stacked or sandwiched fashion as shown in FIG. 4.

Then, the electrodes 32', 34' are brought together and heat and pressure are applied to the sandwiched joint thereby joining the contact pads 42A, 42B to the metal plates 40A and 40B while simultaneously shaping the joint. The joining process results in metallurgical bonding. Typically, the force applied by the electrodes 32', 34' is in the range of about 1100 lbs. to about 1400 lbs. Typically, the current passed between the electrodes 32', 34' is in the range of 18,000 amperes to 21,000 amperes. A heating period of about 11 cycles is followed by a cooling period of about 5 cycles. The heating-cooling sequence is typically repeated 4 or 5 times. The resultant joint is the contact pad structure of FIG. 3.

Referring to the electrode structure of FIG. 4, it is to be noted that each of the electrodes 32', 34' is shown as a single structure having left-hand and right-hand portions separated by a dashed line portion. In one preferred apparatus 30', only one of the portions, i.e., left-hand or right-hand, is employed. In such an apparatus, the contact pads 42A and 42B are sequentially joined to the separate legs 41. However, if desired, each of the electrodes 32', 34' , may comprise a single structure such that the contact pads 42A and 42B are simultaneously joined to the separate legs 41.

Figure 5:
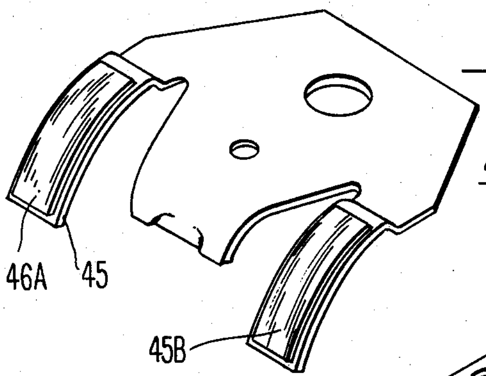
FIG. 5 is a perspective view showing another component of electrical apparatus having a pair of contact pads joined thereto through the method of the present invention. The component of FIG. 5 may be employed as a mating electrical contact for the component of FIG. 3.

Referring now to FIG. 5, another component having a contact pad joined thereto in accordance with the present invention is generally designated 44. Component 44 comprises a tin coated copper member 45. Contact pads 46A and 46B are adapted to electrically mate with contact pads 42A, 42B of FIG. 3.

GENERAL CONSIDERATIONS

Generally, the method of the present invention is suitable for applications in which it is desired to obtain a silver or silver alloy arc-resistant contact pad on a metal body. The metal body may be a non-ferrous metal, e.g., copper, or a ferrous metal, e.g., iron. The method includes the use of a compatible metal for joining the silver or silver alloy contact pad to a metal body. In some applications, the compatible metal may comprise a separate member, e.g., a shim. In other applications, the compatible metal is already present on the surface of the metal body to which the silver or silver alloy contact pad is to be joined. The compatible metal is always of a lower melting point that the metals to be joined. In a preferred form of the method of the present invention, the compatible metal comprises tin. For example, in joining silver or silver alloy to copper, tin functions as a catalyst in promoting a coalescent bond, i.e., diffusion bond. Further, tin is particularly desirable in joining silver or silver alloy to copper in view of the low melting point of tin, i.e., about 450° F., and also because tin has an affinity for both silver and copper. When joining silver or silver alloy contact pads to metals such as brass, bronze or steel, the compatible metal preferably comprises tin coated copper.

Also, as mentioned previously, in the resistance bonding process employed in the method of the present invention, the welding electrodes may be of highly conductive material where the heat developed in the joint is primarily at the joint. Alternatively, the electrodes may be of less highly conductive material, i.e., refractory metal, where thermal heating is also provided. Further, if desired, one electrode may be refractory for providing thermal heating while the other electrode may comprise a high conductivity material. In addition, the electrode(s) may be provided with pressure and contact surfaces which are of predetermined configurations so as to simultaneously join a contact pad to a metal body while shaping the combination of the contact pad and the metal body.

Accordingly, the method of the present invention is useful in obtaining an electrical contact pad which is metallurgically bonded to a portion of a metal body. The resultant contact pad is arc resistant, i.e., resistant to erosion. It is to be appreciated that, although selective plating techniques are available to obtain similar contact pads, there are difficulties associated both with such selective plating techniques and with the resultant contact pad. For example, as pointed out in the Background of the Invention, selectively plated contact pads may exhibit poor metallurgical properties which reduce the ability of the plated contact pad to resist erosion due to arcing.

EXAMPLES

The invention may be better appreciated by reference now to the following examples. However, it is to be understood that the invention is not limited to the details recited therein.

Several samples were obtained through the method of the present invention. These samples were analyzed for bond quality by metallography. Such analysis included metallographic examination at magnifications up to 800 times. During the course of such analysis, several photomicrographs were obtained.

EXAMPLE #1

Figure 6:
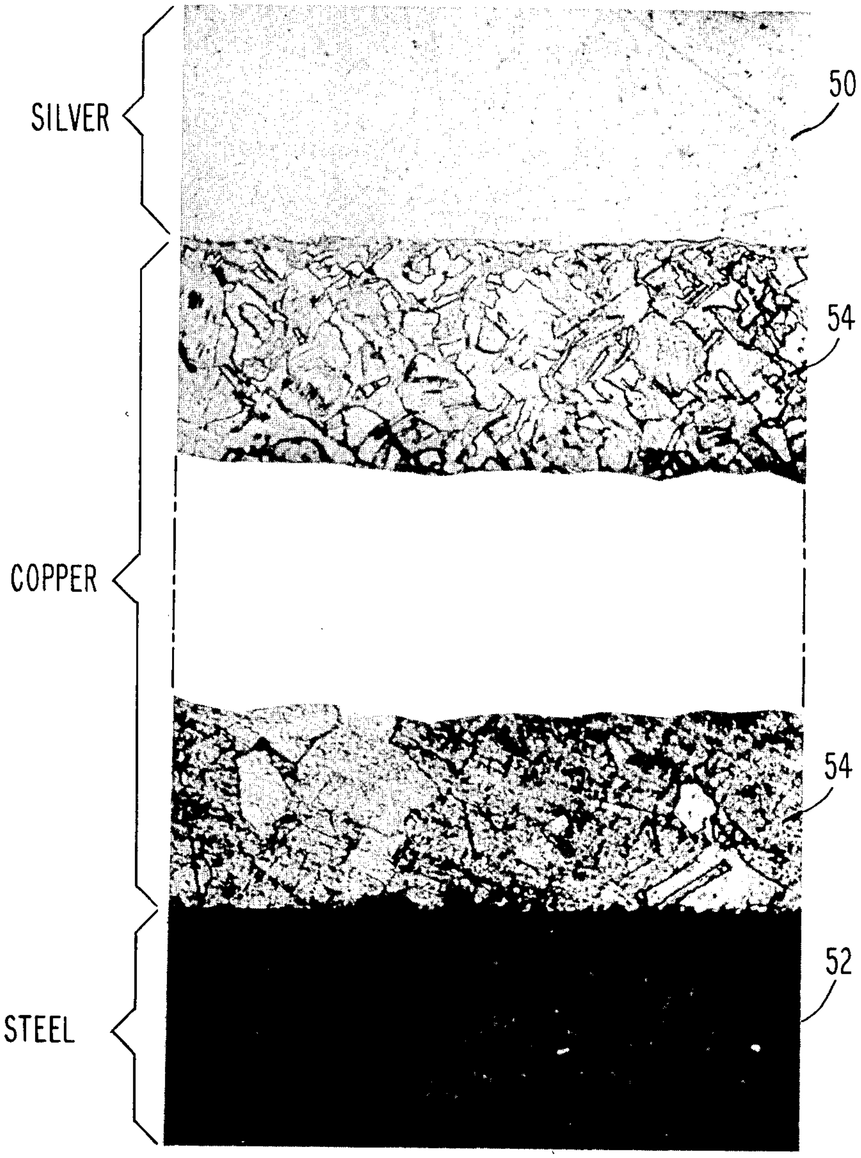
FIG. 6 is a photomicrograph at 800 times magnification showing the cross section of a joint formed through one form of the method of the present invention. In this Figure, the joint comprises a silver contact pad joined to steel through an intermediate shim of tin coated copper.

Referring now to FIG. 6, a photomicrograph of a sample, designated 1, is shown. Sample 1 comprises a contact pad 50 of silver of 0.002" thickness obtained on a steel body 52 through the use of a compatible metal member 54. The steel composition was a low carbon content steel identified as SAE1010. The compatible member 54 comprises a tin coated copper plate of 0.010" thickness. The thickness of the tin coatings was 0.005". Sample #1 was prepared in accordance with the method of the present invention employing two flat welding electrodes. The electrode contacting the silver contact pad 50 was a refractory metal electrode while the electrode contacting the steel surface was a highly conductive copper alloy material. Pressure, temperature and time conditions were substantially the same as the process range discussed in connection with FIGS. 1, 2.

The bond quality of the silver to copper to steel was observed to be excellent. The tin coating showed good coverage and filled substantially all surface discontinuities in the base metals. The tin plate on the copper on the steel side is somewhat obscured in the photomicrograph due to the heavy etch attack on the steel.

EXAMPLE #2

Figure 7:
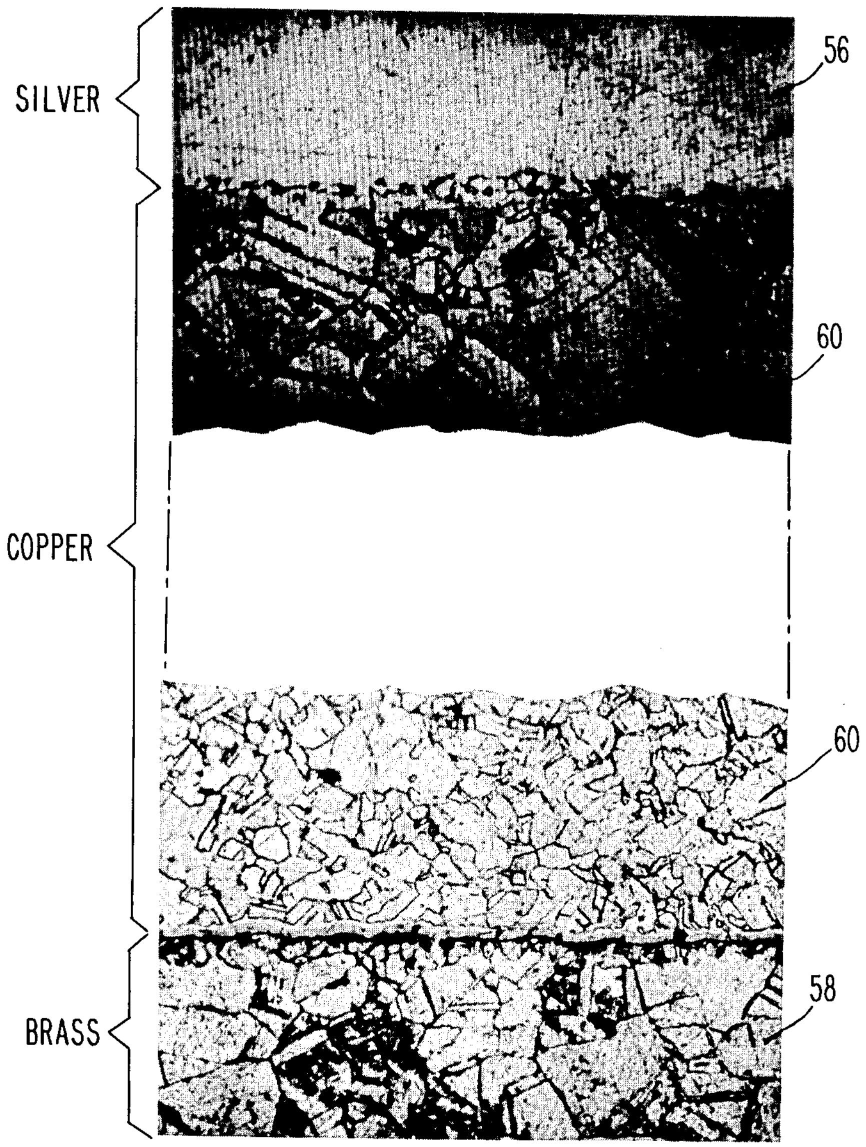
FIG. 7 is a photomicrograph at 800 times magnification showing the cross section of another joint formed through one form of the method of the present invention. In this Figure, the joint comprises a silver contact pad joined to brass through a tin coated copper shim.

Referring now to FIG. 7, a photomicrograph of a sample designated 2 is shown. Sample 2 comprises a silver contact pad 56 of 0.002" thickness obtained on a brass body 58 through the use of a compatible metal member 60. The brass composition was: 60% copper, 40% zinc. The compatible metal member 60 was a tin coated copper plate as in Example 1. Flat electrodes were employed with the electrode for the silver comprising a refractory metal while the electrode for the brass was a highly conductive material. Pressure, temperature, time conditions were similar to those discussed above in Example #1.

The bond quality of the tin to brass and silver was observed to be excellent.

EXAMPLE #3

Figure 8:
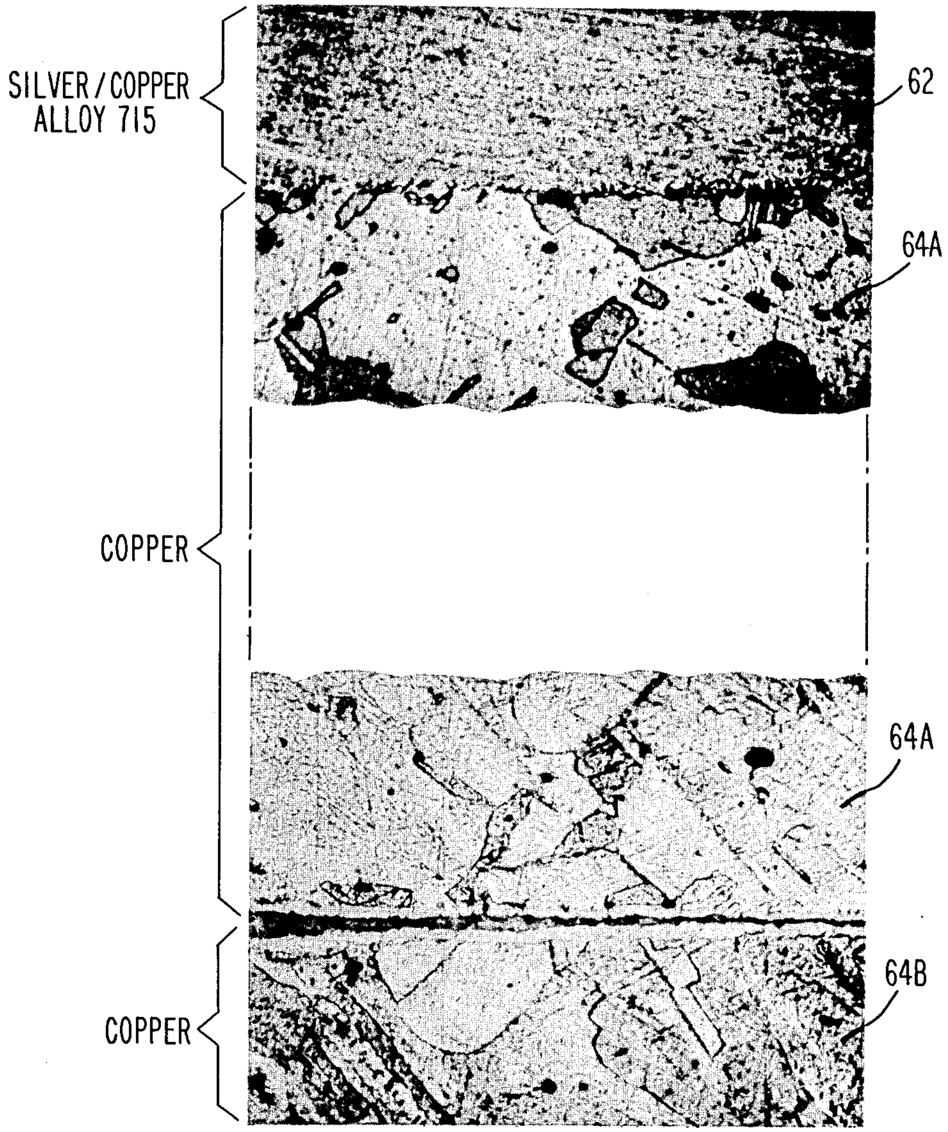
FIG. 8 is a photomicrograph at 800 times magnification showing the cross section of a joint formed through one form of the method of the present invention. In this Figure, the joint comprises a silver-copper alloy contact pad joined to a pair of tin coated copper plates.

Referring now to FIG. 8, a photomicrograph of sample designated 3 is shown. Sample 3 comprises a silver-copper alloy contact pad 62 of 0.002" thickness, comprising: 70% silver, 20% copper, 10% zinc, commercially designated 715 by Handy & Harmon Co., N.Y. The contact pad 62 is joined to a pair of tin coated copper plates 64A, 64B. Each of the tin coated copper plates were of 0.030" in thickness with the tin coatings being 0.0005" in thickness. Sample 3 was obtained through the use of flat refractory electrodes. Pressure, temperture, time conditions were substantially the same as discussed in connection with FIGS. 3 and 4.

The bond quality was observed to be excellent.

EXAMPLE #4

Figure 9:
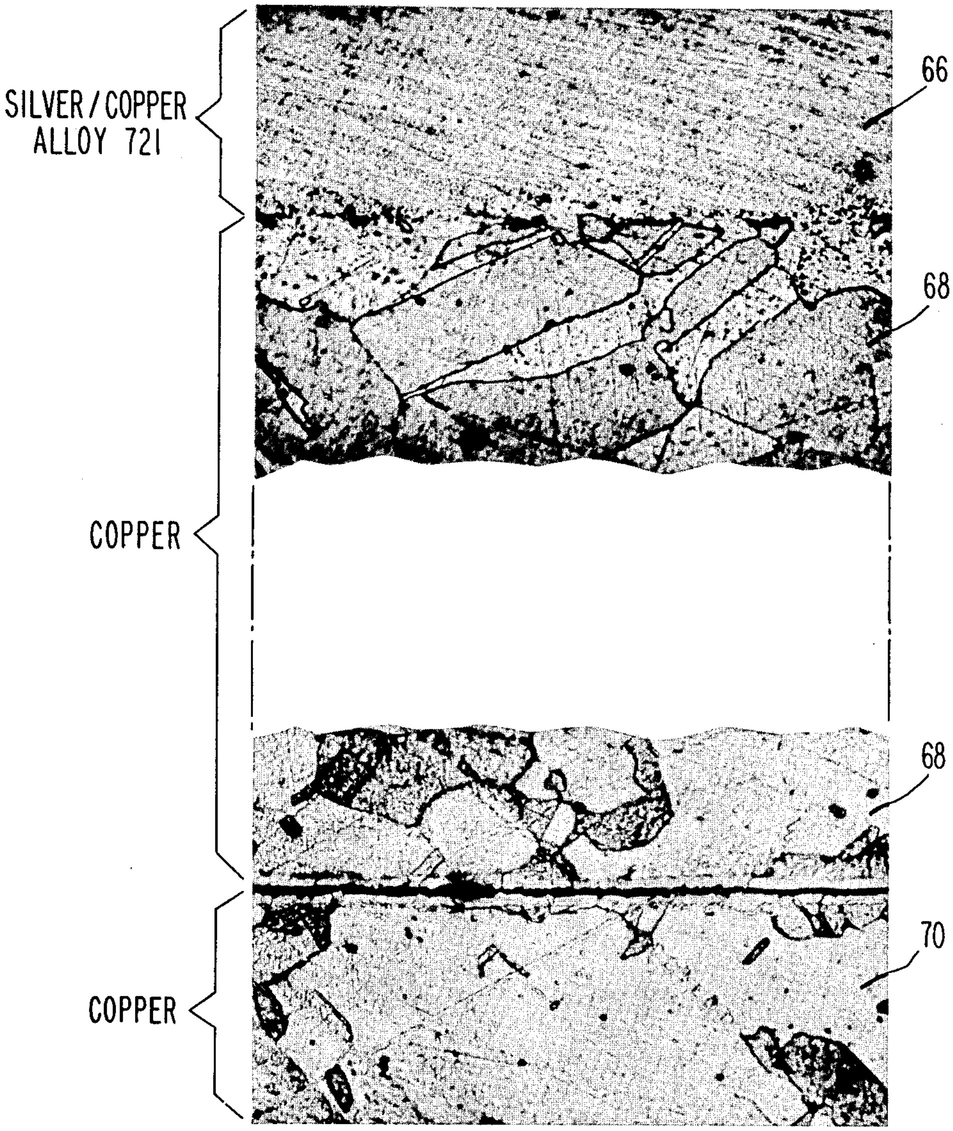
FIG. 9 is a photomicrograph at 800 times magnification showing the cross section of another joint formed through one form of the method of the present invention. In this Figure, another silver-copper alloy contact pad is joined to a pair of tin coated copper plates.

Referring now to FIG. 9, a photomicrograph of a sample designated 4 is shown. Sample 4 comprises a silver-copper alloy contact pad 66 of 0.002" thickness comprising: 72% silver; 28% copper; commercially designated 721 by Handy & Harmon Co. N.Y. The contact pad 66 is joined to a pair of tin coated copper plates 68, 70. Other than the particular silver-copper alloy, sample 4 is substantially the same as sample 3 and was obtained through substantially the same method.

The bond quality was observed to be excellent.

While we have illustrated preferred embodiments of our invention, many modifications will occur to those skilled in the art and we therefore wish to have it understood that we intended in the appended claims to cover all such modifications as fall within the true spirit and scope of our invention.

What is claimed as new and which it is desired to secure by Letters Patent of the United States is:

1. A method of joining a highly conductive arc-resistant electrical contact pad of thin sheet form to a predetermined portion of a surface of a metal body, comprising the steps of:

(a) providing a contact pad of silver and of thin sheet form having a thickness of 0.0005 to 0.010 inches, (b) providing a metal body to which said contact pad is to be joined, (c) providing between said contact pad and said predetermined surface portion of said body an intermediate layer having opposed surfaces that respectively contact said pad and said surface portion, each of said opposed surfaces being of a metal that: (i) has a melting point of about 450° F. and lower than that of the metal of the surface it contacts and (ii) is compatible with the metal of the surface it contacts;

(d) placing the combination of said contact pad, said intermediate layer, and said metal body between a pair of opposed electrodes that contact said pad and said body and applying pressure through said electrodes that forces said contact pad toward said metal body with said intermediate layer located between said pad and said body, (e) passing current between said electrodes while said pressure is being applied, thereby heating said pad, said layer, and said body, (f) discontinuing said current for a brief cooling interval and then repeatedly passing current between said electrodes until the metal of said opposed surfaces of said intermediate layer has been sufficiently heated to melt, (g) discontinuing said heating and allowing the molten metal of said intermediate layer to solidify, thereby providing a metallurgical bond between said pad and said body.

2. A method in accordance with claim 1 in which said metal body is of copper or a copper-base alloy and said surfaces of the intermediate layer are of a metal consisting essentially of tin.

3. A method in accordance with claim 1 in which said metal body is of copper, said intermediate layer surfaces are of a metal consisting essentially of tin, said contact is in the form of a shim and in which steps (d) and (e) of claim 1 comprise applying a force through said electrodes of between about 1100 pounds and about 1400 pounds and passing a current of between about 18,000 amperes and about 21,000 amperes between said electrodes.

4. A method in accordance with claim 1 in which said metal body is of brass or bronze, said intermediate layer surfaces are of a metal consisting essentially of tin, and said contact pad is in the form of a shim, and in which steps (d) and (e) comprise applying a force of between about 1100 pounds and 1400 pounds through said electrodes and passing a current of between about 20,000 amperes and about 24,000 amperes between said electrodes.

5. A method in accordance with claim 1 in which said metal body is of steel, and said intermediate layer comprises a copper member having tin coatings on its opposite faces defining said opposed surfaces.

6. A method in accordance with claim 1 in which the combination of said metal body, said intermediate layer, and said pad are shaped by the pressure applied through said electrodes as defined in step (d), said electrodes having curved opposing faces through which said pressure is applied to effect said shaping.

7. A method in accordance with claim 1 in which said opposed electrodes respectively have opposing faces of predetermined curved configuration for shaping the combination of said metal body and said contact pad, one of said electrodes contacting a surface of said contact pad in opposing relation to a surface of said contact pad which is to be joined to said metal body, the other of said electrodes contacting a surface of said metal body in opposing relation to a surface of said metal body which is to be joined to said contact pad.

8. A method in accordance with claim 1 in which said metal body comprises brass or bronze.

* * * * *